United States Patent [19]
Bullivant

[11] Patent Number: 5,599,099
[45] Date of Patent: Feb. 4, 1997

[54] MATERIAL BLENDING APPARATUS HAVING A PIVOTALLY MOUNTED HOPPER

[75] Inventor: Kenneth W. Bullivant, Chadds Ford, Pa.

[73] Assignee: K-Tron Technologies, Inc., Wilmington, Del.

[21] Appl. No.: 514,427

[22] Filed: Aug. 11, 1995

[51] Int. Cl.$^6$ .................. B01F 11/00; B01F 15/02
[52] U.S. Cl. .................. 366/141; 366/187; 366/238; 425/148
[58] Field of Search .................. 366/76.1, 76.2, 366/76.9, 76.91, 76.92, 76.93, 132, 135, 141, 151.2, 152.6, 180.1, 185, 187, 189, 237, 238; 425/147, 148, 582, 583, 585

[56] References Cited

U.S. PATENT DOCUMENTS

| | | | |
|---|---|---|---|
| 3,410,530 | 11/1968 | Gilman | 366/76.2 |
| 3,871,629 | 3/1975 | Hishida | 366/76.2 |
| 3,920,229 | 11/1975 | Piggott | 366/76.2 |
| 4,459,028 | 7/1984 | Bruder et al. | 366/141 |
| 4,812,048 | 3/1989 | Neumann et al. | 366/141 |
| 5,110,521 | 5/1992 | Moller | 425/148 X |
| 5,213,724 | 5/1993 | Saatkamp | 366/76.91 X |

FOREIGN PATENT DOCUMENTS 507689  10/1992  European Pat. Off. ............ 366/141

*Primary Examiner*—Charles E. Cooley
*Attorney, Agent, or Firm*—Ratner & Prestia

[57] ABSTRACT

A weigh batch blender including a hopper pivotally mounted within a housing and having two compartments between which ingredient materials which have been individually introduced into the hopper are transferred to blend the ingredient materials as the hopper is pivoted between two "mix" positions at the ends of the pivotal range of the hopper. After blending, the hopper is moved to beyond one of the ends of pivotal movement of the hopper to dump the blended ingredient material contents of the hopper.

26 Claims, 5 Drawing Sheets

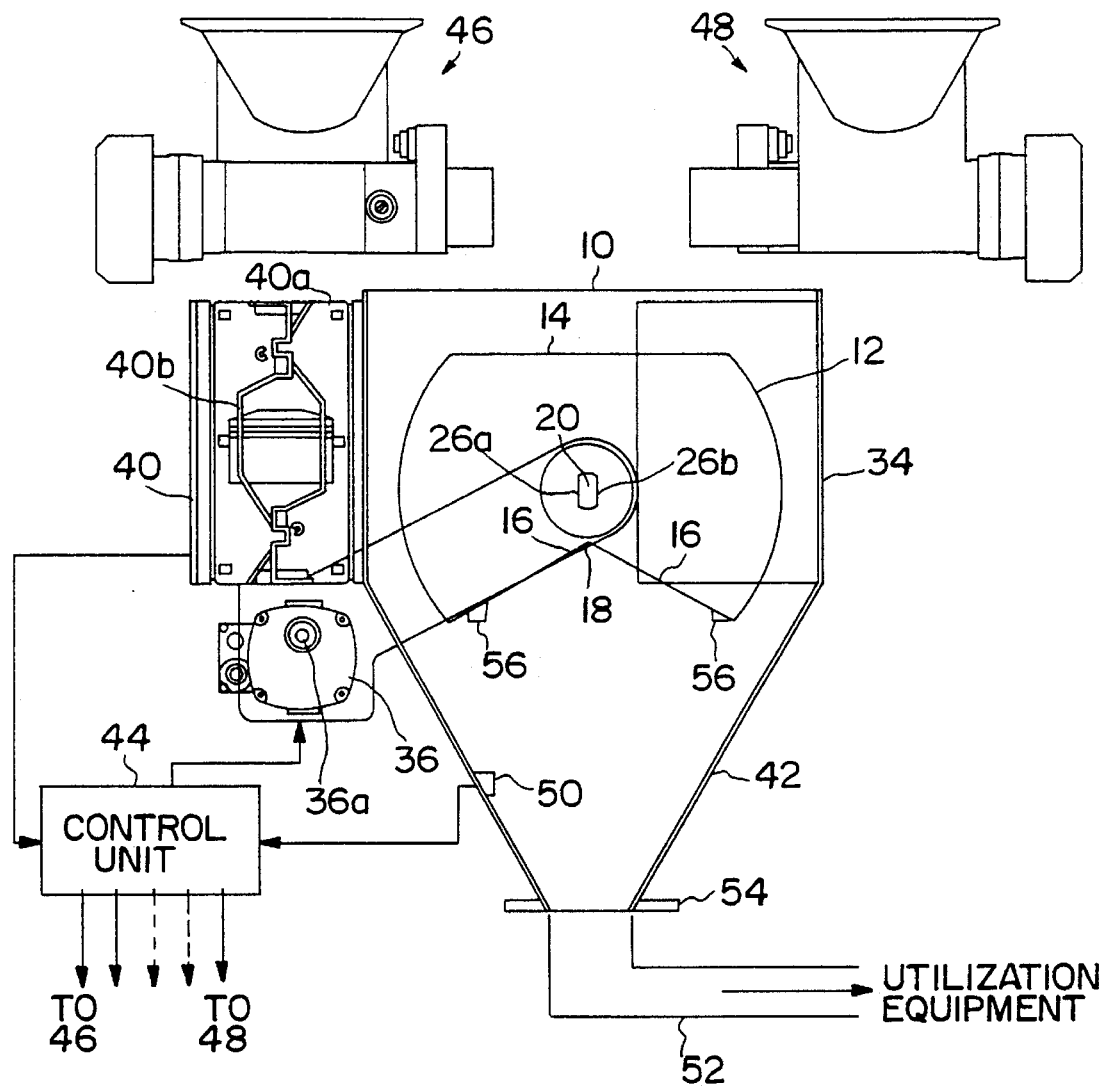
F I G. 1

5,599,099

MATERIAL BLENDING APPARATUS HAVING A PIVOTALLY MOUNTED HOPPER

TECHNICAL FIELD

The present invention relates, in general, to materials handling and, in particular, to apparatus which blends ingredient materials and delivers the blended materials to utilization apparatus.

BACKGROUND OF THE INVENTION

Conventional weigh batch blenders for the plastics industry incorporate a single, scale-mounted weigh hopper into which the different ingredient materials of a desired blend are sequentially fed from two or more screw feeders or other dispensing units. The feeding of the different ingredient materials is metered by a control system which responds to the incremental increases in the total weight of the weigh hopper as each ingredient material of the desired blend is added to the weigh hopper. After the control system has caused the desired weight of each ingredient material to be dispensed into the weigh hopper, the entire contents of the weigh hopper are dumped into a mixing chamber located below the weigh hopper. The dumping is usually effected by a pneumatically operated gate, such as a trap door, in the bottom of the weigh hopper. Motorized rotating mixing blades in the mixing chamber blend the ingredient materials together. Utilization equipment, such as extrusion or molding machines, draws the blended material, as required, by gravity through a port in the bottom of the mixing chamber.

One problem with conventional weigh batch blenders is the tendency of certain ingredient materials to segregate due to the action of the stirring blades, whereby non-uniform blends are delivered. The action of the mixing blades, intended to mix the ingredient materials, can, in fact, cause segregation of the ingredient materials. Color concentrate pellets, for example, might not mix uniformly with natural plastic resin pellets due to differing size, density or electrostatic properties.

Other shortcomings of conventional weigh batch blenders are excessive size, complexity of design and difficulty in cleaning. Because the weigh hopper is located above the mixing chamber, conventional weigh batch blenders are relatively large in height. The design of the motorized mixing blades, positioned in the mixing chamber, and the mechanisms by which the mixing blades are coupled to the source of power tend to be complex. Thorough cleaning is normally required to avoid contamination when changing recipes, particularly when changing colors. Because of the number of parts (e.g. weigh hopper, discharge gate and actuating mechanism, mixing chamber and mixing blades) which come into contact with the blended ingredient materials and the complexity in design cleaning can be difficult and time consuming even when the parts are designed to be removable.

SUMMARY OF THE INVENTION

A weigh batch materials blender, constructed in accordance with the present invention, includes a housing and a hopper having a top opening through which ingredient materials are introduced individually into the hopper and through which blended ingredient materials are dumped from the hopper and a floor composed of two inclined plates forming two compartments in the hopper with each of the inclined plates extending upward from the inside surface of the hopper and meeting along an intersection line. This weigh batch materials blender also includes mounting means for mounting the hopper within the housing for pivotal movement of the hopper relative to the housing about a horizontal pivot axis and movement means for imparting pivotal movement to the hopper. A weigh batch blender, constructed in accordance with the present invention, further includes a scale having a base mounted to the housing and a sensing portion coupled to the hopper for measuring the weight of the hopper and a discharge chamber at the bottom of the housing and below the hopper into which blended ingredient materials are dumped from the hopper. Control means control (a) the amounts of the ingredient materials introduced into the hopper, (b) the movement means to impart pivotal movement over a predetermined range to the hopper at the completion of the introduction of the ingredient materials into the hopper to mix the ingredient materials, and (c) the movement means to impart additional pivotal movement in one direction beyond the predetermined pivotal range to dump blended ingredient materials from the hopper into the discharge chamber.

According to another aspect of the present invention, a weigh batch blender, constructed in accordance with the present invention, can be arranged for the hopper of the blender to receive individually a plurality of ingredient materials from two or more ingredient materials feeders and deliver the blended ingredient material from discharge chamber of the blender to utilization equipment.

BRIEF DESCRIPTION OF THE DRAWINGS

FIG. 1 is a front view of a weigh batch materials blender, constructed in accordance with the present invention, positioned to receive ingredient materials from two feeders and to deliver blended material to utilization equipment.

DETAILED DESCRIPTION OF THE INVENTION

Figure 2:
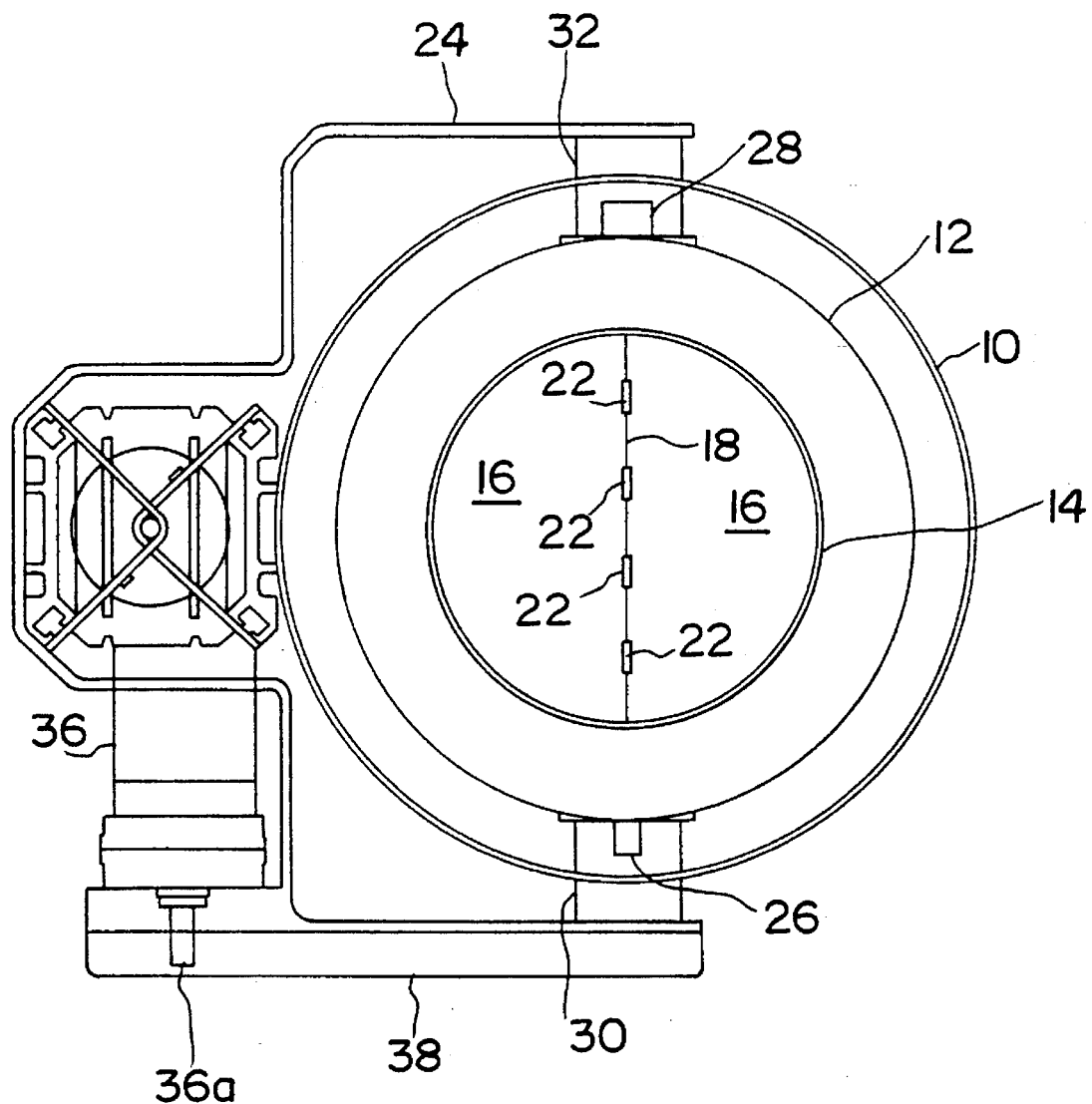
FIG. 2 is a top view of the weigh batch materials blender of FIG. 1.

Referring to FIGS. 1, 2 and 3A through 3E, a weigh batch materials blender, constructed in accordance with the present invention, includes a housing 10 and a hopper 12 having a top opening 14 through which ingredient materials are introduced individually into the hopper and through which blended ingredient materials are dumped from the hopper and a floor composed of two inclined plates 16 forming two compartments in the hopper. Each of the inclined plates 16 extends upward from the inside surface of hopper 12 and the two inclined plates meet along an intersection line 18. For the embodiment of the invention being described, hopper 12 is a truncated sphere having a circular top opening. Hopper 12 can take other forms, such as a truncated cylinder, and the shape of the hopper, shown in certain of the figures, can also be taken to represent a truncated cylinder.

Hopper 12 is mounted within housing 10 for pivotal movement of the hopper relative to the housing about a horizontal pivot axis 20 which coincides with the horizontal axis of rotation of the hopper. Intersection line 18 extends parallel to and below pivot axis 20 in a vertical plane through which the pivot axis extends. For the embodiment of the invention being described, inclined plates 16 each extend approximately 30 degrees from the horizontal.

Preferably, a plurality of vertical vanes 22 are positioned along intersection line 18. Each of the vanes 22 extends parallel to intersection line 18.

For the embodiment of the invention being described, the means by which hopper 12 is mounted within housing 10 include a frame 24 external to the housing, a first pivot pin 26 extending from the hopper along pivot axis 20 and having a pair of flat faces 26a and 26b, and a second pivot pin 28 disposed opposite from pivot pin 26 extending from the hopper along the pivot axis and having a circular cross-section. A first carrier 30, extending from frame 24 through a first clearance opening in housing 12 and having a recess having a pair of flat sides, receives pivot pin 26. A second carrier 32, extending from frame 24 through a second clearance opening in housing 12 and having a circular recess, receives pivot pin 28. The recess of carrier 30 and the recess of carrier 32 have openings at their tops through which pivot pin 26 and pivot pin 28, respectively, pass to separate hopper 12 from the mounting means and remove the hopper from housing 10 through an opening in the housing, represented by a door 34, which is sized to permit removal of the hopper from the housing.

A weigh batch materials blender, constructed in accordance with the present invention, also includes movement means for imparting pivotal movement to hopper 12. Such means include, for the embodiment of the invention being described, a motor 36 having an output shaft 36a and a coupling 38 extending between the output shaft of the motor and carrier 30 within which pivot pin 26 is received.

A weigh batch materials blender, constructed in accordance with the present invention, further includes a scale 40 having a base 40a mounted to housing 10 and a sensing portion 40b, typically in the form of a conventional load cell, coupled to hopper for measuring the weight of the hopper and its contents. Frame 24 to which hopper 12 is connected rests on load cell 40b of scale 40. Load cell 40b has a parallel fixture system which is highly compliant to vertical forces but is stiff with respect to lateral forces and torque loads. With carriers 30 and 32 passing through clearance holes in housing 10, hopper 12 and its contents are weighed precisely by load cell 40b.

A discharge chamber 42 at the bottom of housing 10 and below hopper 12 receives blended ingredient materials which are dumped from the hopper. For a truncated, spherical hopper 12 having a circular top opening 14, discharge chamber 42 preferably is conical.

A weigh batch materials blender, constructed in accordance with the present invention, further includes a control unit 44 for controlling:

(a) the amounts of the ingredient materials introduced into hopper 12, (b) the movement means, in particular motor 36, to impart pivotal movement over a predetermined range to the hopper at the completion of the introduction of the ingredient materials into the hopper to mix the ingredient materials, and (c) the movement means, in particular motor 36, to impart additional pivotal movement in one direction beyond the predetermined pivotal range to dump blended ingredient materials from the hopper into discharge chamber 42.

Figure 4A:
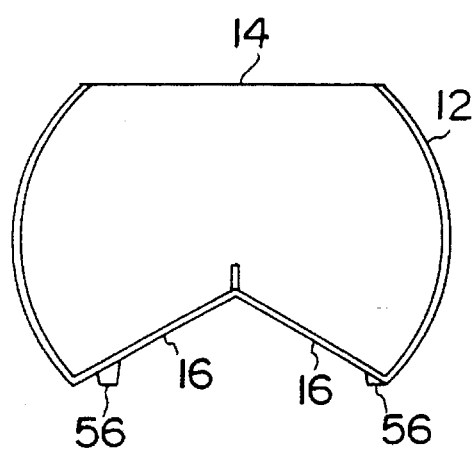
FIGS. 4A through 4D show the hopper of the FIGS. 1 and 2 weigh batch materials blender in four operating positions.
Figure 4B:
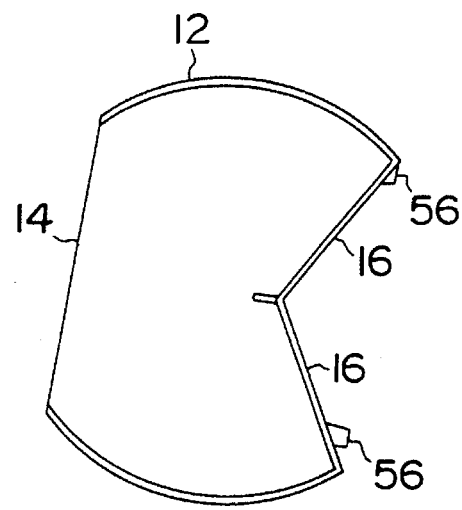
Figure 4C:
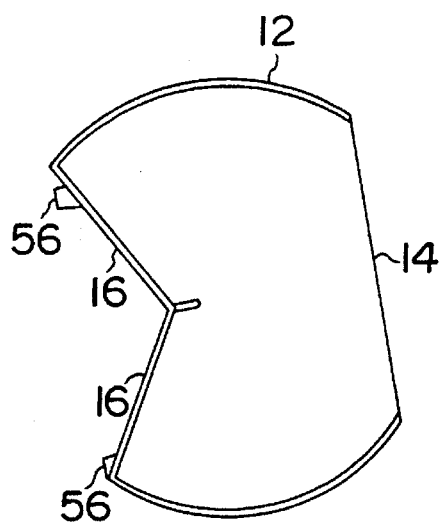
Figure 4D:
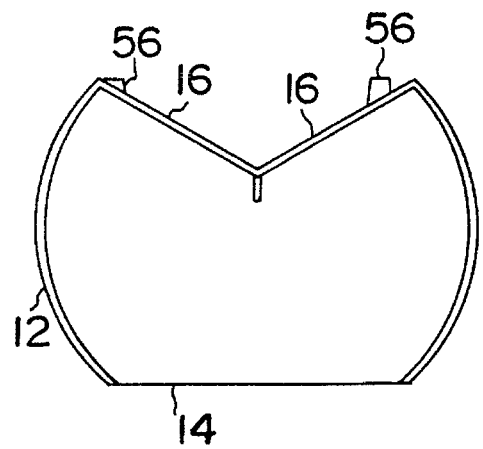

Referring to FIGS. 4A through 4D, hopper 12 is moved between a "weigh" position shown in FIG. 4A, two "mix" positions shown in FIGS. 4B and 4C and a "dump" position shown in FIG. 4D.

While hopper 12 is in the "weigh" position, ingredient materials are delivered to the hopper through top opening 14 of the hopper. Control unit 44, in response to scale 40, meters the amount of ingredient materials individually introduced into hopper 12 in the usual manner by controlling the supply of ingredient materials from a plurality of feeders 46 and 48. The desired amount of each ingredient material is programmed into control unit 44. When the desired amount of an ingredient material has been introduced into hopper 12, as indicated by the accumulated weight readings of scale 40, control unit 44 stops the supply from the particular feeder and causes the next feeder in the sequence of the loading of ingredient materials to supply its ingredient materials to the hopper. This is indicated by the outputs TO 46 and TO 48 of control unit 44. The additional outputs of control unit 44 represent the control of additional feeders.

At the completion of the introduction of the ingredient materials into hopper 12, control unit 44 causes motor 36 to impart prescribed pivotal movement over a predetermined range to the hopper to mix the ingredient materials in the hopper. Hopper 12 pivots first in one direction to the position shown in FIG. 4B and then in an opposite direction to the position shown in FIG. 4C. The total volume of the contents of hopper 12 is chosen such that, in each mixing position, shown in FIG. 4B and 4C, all of the contents cascade from one compartment of the hopper to the other compartment without significant spillage through opening 14 of the hopper. Control unit 44 causes hopper 12 to remain at each end of pivotal movement of the hopper (i.e. the "mix" position) for a prescribed period of time sufficient to permit all of the ingredient materials to move from one of the compartments of the hopper to the other compartment of the hopper. A typical range of pivotal movement of hopper 12 is approximately 160 degrees.

Two types of mixing action occur during the mixing operation. Ingredient material which is not restrained from cascading by vanes 22 and which is near the top cascades over the lower lying ingredient material which rests on the downward sloping plate 16 and tends to reach the compartment being filled before the retarded lower lying ingredient material. The retarded ingredient material tends to end up on top of the pile in the compartment being filled and tends to slide ahead when hopper 12 reverses in the opposite direction to the other "mix" position. This exchanging action blends the ingredient materials without allowing denser ingredient material to travel to the bottom because the bottom ingredient material is repeatedly dumped on top of the other ingredient material.

The presence of vanes 22 allows thorough mixing to be accomplished more rapidly by introducing a secondary mixing action simultaneously with the first. This occurs due to a "combing" action where ingredient material behind vanes 22 is retarded by the vanes while ingredient material not behind the vanes flows rapidly between the vanes. Because the ingredient material stream flattens out after it passes vanes 22, only portions of this ingredient material will be retarded by the vanes on the return flow. This splitting action speeds the mixing process. Those small portions of ingredient material directly behind vanes 22 which do not cascade fall into the mix on the reverse cycle because this ingredient material lies ahead of the vanes during the reverse cycle. After a number of programmed pivotal movements of hopper 12, motor 36 is stopped and causes the hopper to assume the "weigh" position and hold the contents of the blended ingredient materials.

A conventional level sensor 50 senses the level of blended ingredient materials in discharge chamber 42 and signals the need for additional blended ingredient materials. Control unit 44, in response to level sensor 50, causes motor 36 to impart additional pivotal movement to the hopper in one direction beyond the predetermined pivotal range to the "dump" position (i.e. approximately 100 degrees beyond one of the "mix" positions) as shown in FIG. 4D to dump blended ingredient materials from the hopper into discharge chamber 42. After a brief pause which allows the entire contents of hopper 12 to be dumped into discharge chamber 42, the hopper is pivoted back to the "weigh" position shown in FIG. 4A and another batch of the blended ingredient materials is prepared. The blended ingredient materials are delivered to utilization equipment (e.g. an extruder or molding machine) by suitable means represented by a chute 52 or the lower end of discharge chamber 42 can be connected directly to the utilization equipment by means of a flange 54.

Level sensor 50 is positioned in discharge chamber 42 so that there is more than sufficient blended ingredient materials in the discharge chamber to permit uninterrupted delivery of blended ingredient materials to the utilization equipment while the next batch of blended ingredient material is being prepared. At the same time, there must be sufficient space above level sensor 50 to permit the entire contents of hopper 12 to be dumped without the last of the dumped material dragging on the hopper and thus cause an error when the next batch of blended ingredient materials is being weighed.

Figure 3A:
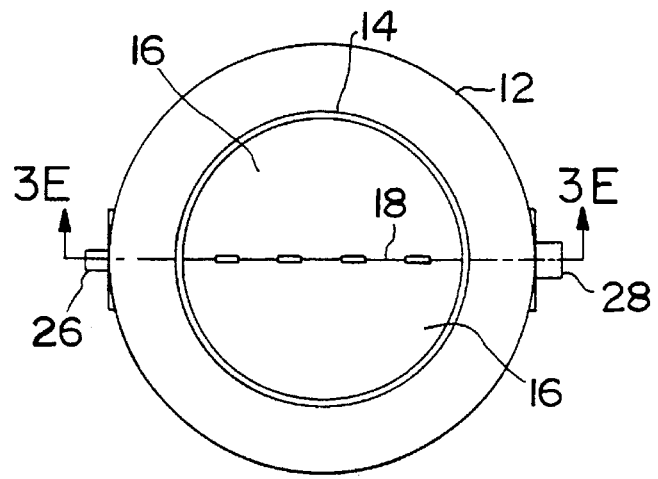
FIG. 3A is a top view of the hopper of the FIGS. 1 and 2 weigh batch materials blender.
Figure 3B:
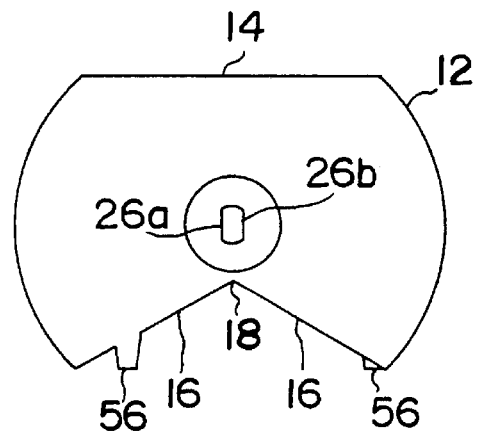
FIG. 3B is a side view of the hopper of the FIGS. 1 and 2 weigh batch materials blender.
Figure 3C:
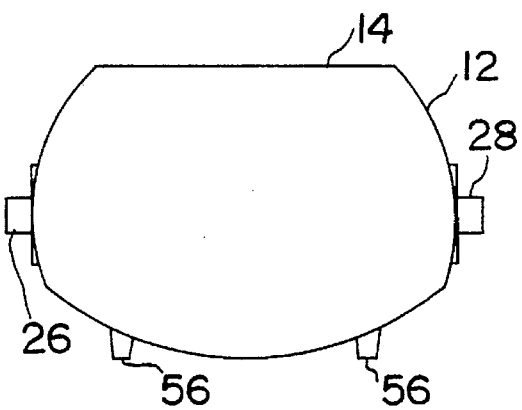
FIG. 3C is a front view of the hopper of the FIGS. 1 and 2 weigh batch materials blender.
Figure 3E:
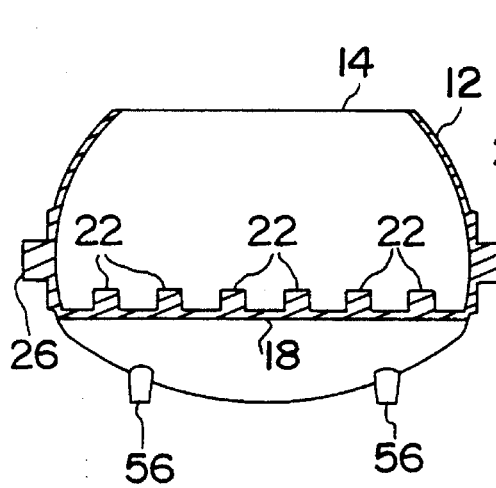
FIG. 3E is a sectional view taken along line 3E—3E of FIG. 3A.
Figure 3D:
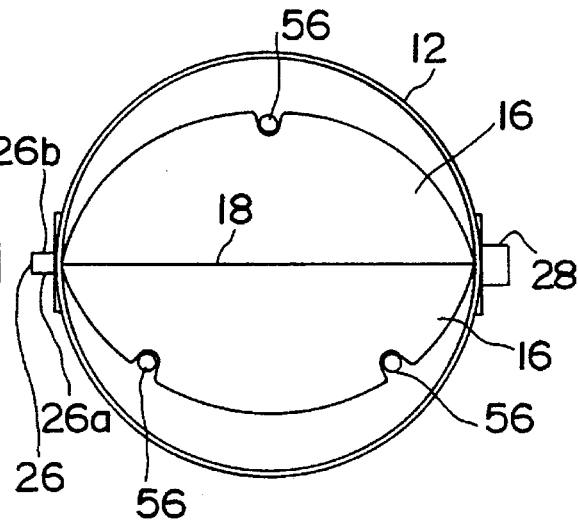
FIG. 3D is a bottom view of the hopper of the FIGS. 1 and 2 weigh batch materials blender.

For convenient storage of hopper 12 outside of housing 10, whether the hopper is empty or contains ingredient materials, the hopper preferably has a plurality of feet 56. A three-footed arrangement, as shown most clearly in FIG. 3D, is desirable because it does not require precise fabrication to provide stable support.

Figure 5:
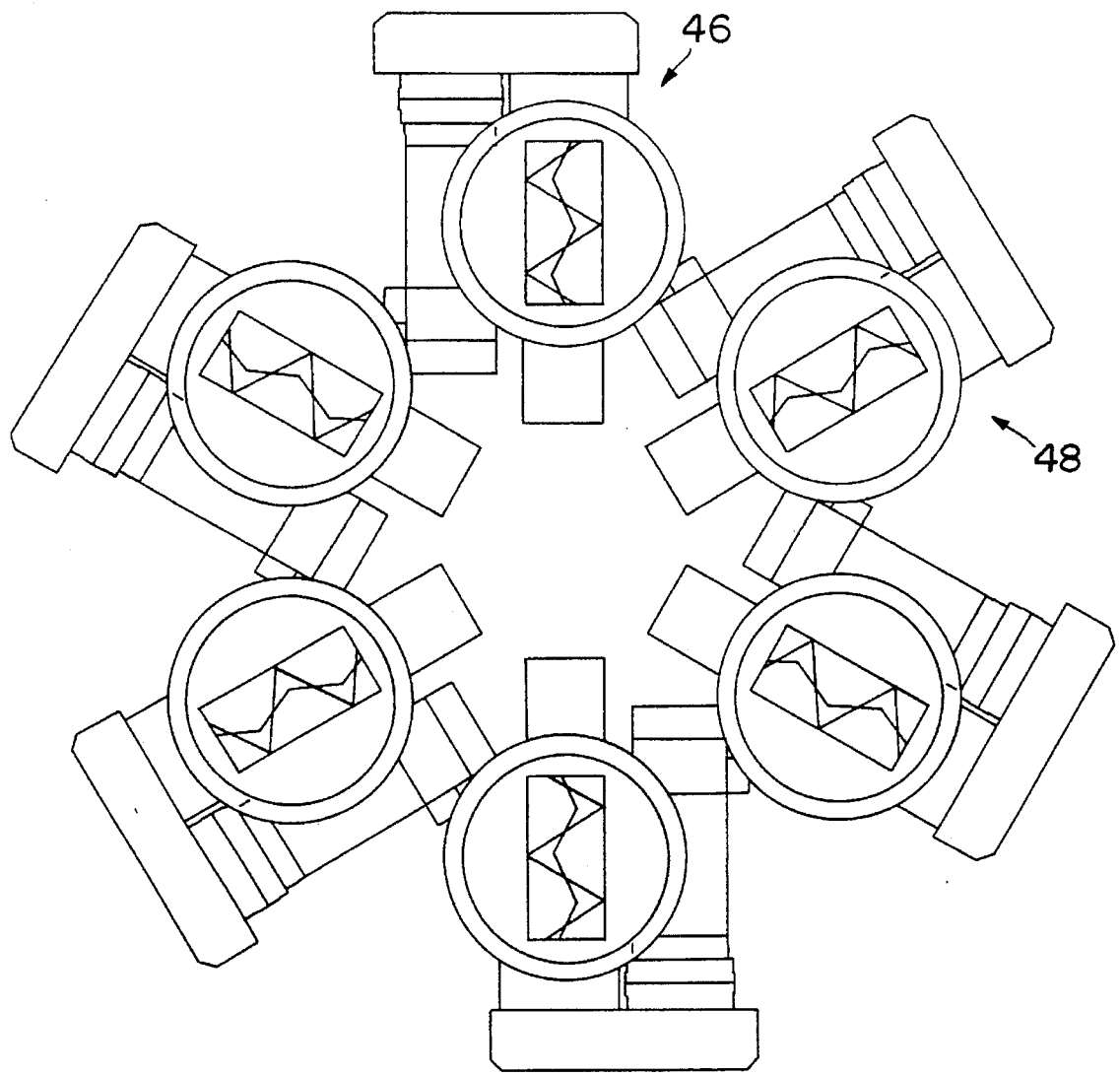
FIG. 5 is a top view of six ingredient materials feeders disposed to supply individually ingredient materials to a weigh batch materials blender constructed in accordance with the present invention.

FIG. 5 shows how a plurality of ingredient material feeders can be arranged about a weigh batch blender constructed in accordance with the present invention. The size of hopper 12 and its top opening 14 are selected for the particular application and the number of ingredient materials which are to be blended.

While there have been described preferred embodiments of the present invention, it will be obvious to those skilled in the art that various changes and modifications may be made without departing from the spirit and scope of the invention as defined in the following claims.

What is claimed:

1. A weigh batch materials blender comprising:

a housing;

a hopper having:

(a) a top opening through which ingredient materials are introduced individually into said hopper and through which blended ingredient materials are dumped from said hopper, and (b) a floor composed of two inclined plates forming two compartments in said hopper, each of said inclined plates extending upward from the inside surface of said hopper and meeting along an intersection line;

mounting means for mounting said hopper within said housing for pivotal movement of said hopper relative to said housing about a horizontal pivot axis;

movement means for imparting pivotal movement to said hopper;

a scale having a base mounted to said housing and a sensing portion coupled to said hopper for measuring the weight of said hopper;

a discharge chamber at the bottom of said housing and below said hopper into which blended ingredient materials are dumped from said hopper; and control means for controlling:

(a) the amounts of said ingredient materials introduced into said hopper, (b) said movement means to impart pivotal movement over a predetermined range to said hopper at the completion of the introduction of said ingredient materials into said hopper to mix said ingredient materials, and (c) said movement means to impart additional pivotal movement in one direction beyond said predetermined pivotal range to dump blended ingredient materials from said hopper into said discharge chamber.

2. A weigh batch materials blender according to claim 1 wherein said control means control said hopper to remain at each end of pivotal movement of said hopper for a prescribed period of time sufficient to permit all of the ingredient materials to move from one of said compartments of said hopper to the other of said compartments of said hopper.

3. A weigh batch materials blender according to claim 2 wherein said control means are responsive to said scale to control the amounts of said ingredient materials introduced into said hopper.

4. A weigh batch materials blender according to claim 3 further including level sensing means for sensing the level of blended ingredient materials in said discharge chamber and said control means are responsive to said level sensing to impart additional pivotal movement in one direction beyond said predetermined pivotal range to dump blended ingredient materials from said hopper into said discharge chamber.

5. A weigh batch materials blender according to claim 4 wherein:

(a) said pivot axis coincides with the horizontal axis of rotation of said hopper, and (b) said intersection line extends parallel to and below said pivot axis in a vertical plane through which said pivot axis extends.

6. A weigh batch materials blender according to claim 5 further including a plurality of vertical vanes on said intersection line, each of said vanes extending parallel to said intersection line.

7. A weigh batch materials blender according to claim 6 wherein said inclined plates extend approximately 30 degrees from the horizontal.

8. A weigh batch materials blender according to claim 6 wherein said predetermined range of pivotal movement of said hopper is approximately 160 degrees and said additional pivotal movement beyond said predetermined pivotal range to dump blended ingredient materials from said hopper is approximately 100 degrees beyond said predetermined pivotal range.

9. A weigh batch materials blender according to claim 6 wherein said mounting means include:

(a) a frame external to said housing resting on said sensing portion of said scale, (b) a first pivot pin extending from said hopper along said pivot axis and having a pair of flat faces, (c) a second pivot pin disposed opposite from said first pivot pin extending from said hopper along said pivot axis and having a circular cross-section, (d) a first carrier extending from said frame through a first clearance opening in said housing and having a recess having a pair of flat sides within which said first pivot pin is received, and (e) a second carrier extending from said frame through a second clearance opening in said housing and having a circular recess within which said second pivot pin is received.

10. A weigh batch materials blender according to claim 9 wherein said movement means include:

(a) a motor having an output shaft, and (b) a coupling extending between said output shaft of said motor and said first carrier.

11. A weigh batch materials blender according to claim 10 wherein:

(a) said housing has an opening sized to permit removal of said hopper from said housing, and (b) said recess of said first carrier and said recess of said second carrier have openings at their tops through which said first pivot pin and said second pivot pin pass to separate said hopper from said mounting means and remove said hopper from said housing.

12. A weigh batch materials blender according to claim 5 wherein:

(a) said hopper is a truncated sphere having a circular top opening, and (b) said discharge chamber is conical.

13. A weigh batch materials blender according to claim 5 wherein said hopper is a truncated cylinder.

14. Apparatus for blending ingredient materials comprising:

means for individually supplying a plurality of ingredient materials; a housing;

a hopper having:

(a) a top opening through which the ingredient materials are introduced individually into said hopper and through which blended ingredient materials are dumped from said hopper, and (b) a floor composed of two inclined plates forming two compartments in said hopper, each of said inclined plates extending upward from the inside surface of said hopper and meeting along an intersection line;

mounting means for mounting said hopper within said housing for pivotal movement of said hopper relative to said housing about a horizontal pivot axis;

movement means for imparting pivotal movement to said hopper;

a scale having a base mounted to said housing and a sensing portion coupled to said hopper for measuring the weight of said hopper;

a discharge chamber at the bottom of said housing and below said hopper into which blended ingredient materials are dumped from said hopper; and control means for controlling:

(a) the amounts of said ingredient materials introduced into said hopper, (b) said movement means to impart pivotal movement over a predetermined range to said hopper at the completion of the introduction of said ingredient materials into said hopper to mix said ingredient materials, and (c) said movement means to impart additional pivotal movement in one direction beyond said predetermined pivotal range to dump blended ingredient materials from said hopper into said discharge chamber; and means for delivering the blended ingredient material from said discharge chamber to utilization equipment.

15. Apparatus for blending ingredient materials according to claim 14 wherein said control means control said hopper to remain at each end of pivotal movement of said hopper for a period of time sufficient to permit all of the ingredient materials to move from one of said compartments of said hopper to the other of said compartments of said hopper.

16. Apparatus for blending ingredient materials according to claim 15 wherein said control means are responsive to said scale to control the amounts of said ingredient materials introduced into said hopper.

17. Apparatus for blending ingredient materials according to claim 16 further including level sensing means for sensing the level of blended ingredient materials in said discharge chamber and said control means are responsive to said level sensing to impart additional pivotal movement in one direction beyond said predetermined pivotal range to dump blended ingredient materials from said hopper into said discharge chamber.

18. Apparatus for blending ingredient materials according to claim 17 wherein:

(a) said pivot axis coincides with the horizontal axis of rotation of said hopper, and (b) said intersection line extends parallel to and below said pivot axis in a vertical plane through which said pivot axis extends.

19. Apparatus for blending ingredient materials according to claim 18 further including a plurality of vertical vanes on said intersection line, each of said vanes extending parallel to said intersection line.

20. Apparatus for blending ingredient materials according to claim 19 wherein said inclined plates extend approximately 30 degrees from the horizontal.

21. Apparatus for blending ingredient materials according to claim 19 wherein the range of pivotal movement of said hopper is approximately 160 degrees and said additional pivotal movement beyond said predetermined pivotal range to dump blended ingredient materials from said hopper is approximately 100 degrees beyond said predetermined pivotal range.

22. Apparatus for blending ingredient materials according to claim 19 wherein said mounting means include:

(a) a frame external to said housing resting on said sensing portion of said scale, (b) a first pivot pin extending from said hopper along said pivot axis and having a pair of flat faces, (c) a second pivot pin disposed opposite from said first pivot pin extending from said hopper along said pivot axis and having a circular cross-section, (d) a first carrier extending from said frame through a first clearance opening in said housing and having a recess having a pair of flat sides within which said first pivot pin is received, and (e) a second carrier extending from said frame through a second clearance opening in said housing and having a circular recess within which said second pivot pin is received.

23. Apparatus for blending ingredient materials according to claim 22 wherein said movement means include:

(a) a motor having an output shaft, and (b) a coupling extending between said output shaft of said motor and said first carrier.

24. Apparatus for blending ingredient materials according to claim 23 wherein:

(a) said housing has an opening sized to permit removal of said hopper from said housing, and (b) said recess of said first carrier and said recess of said second carrier have openings at their tops through which said first pivot pin and said second pivot pin pass to separate said hopper from said mounting means and remove said hopper from said housing.

25. Apparatus for blending ingredient materials according to claim 18 wherein:

(a) said hopper is a truncated sphere having a circular top opening, and (b) said discharge chamber is conical.

26. Apparatus for blending ingredient materials according to claim 18 wherein said hopper is a truncated cylinder.

* * * * *

UNITED STATES PATENT AND TRADEMARK OFFICE
CERTIFICATE OF CORRECTION

PATENT NO.   : 5,599,099
DATED        : February 4, 1997
INVENTOR(S)  : Kenneth W. Bullivant It is certified that error appears in the above-indentified patent and that said Letters Patent is hereby corrected as shown below:

In column 7, line 40, claim 14, "a housing;" should begin a new line.

Signed and Sealed this

Tenth Day of June, 1997

Attest:

Attesting Officer

BRUCE LEHMAN

Commissioner of Patents and Trademarks